US008185343B1

(12) United States Patent
Fitzgerald et al.

(10) Patent No.: US 8,185,343 B1
(45) Date of Patent: May 22, 2012

(54) BASE STATION AND METHOD FOR DETECTING EMPLACEMENT OF IMPROVISED EXPLOSIVE DEVICES

(75) Inventors: James Fitzgerald, Westford, MA (US); Robert L. Steadman, Mansfield, MA (US)

(73) Assignee: Textron Systems Corporation, Wilmington, MA (US)

( * ) Notice: Subject to any disclaimer, the term of this patent is extended or adjusted under 35 U.S.C. 154(b) by 634 days.

(21) Appl. No.: 11/697,941

(22) Filed: Apr. 9, 2007

Related U.S. Application Data

(63) Continuation of application No. 11/481,671, filed on Jul. 6, 2006, now abandoned.

(60) Provisional application No. 60/749,974, filed on Dec. 13, 2005.

(51) Int. Cl.
*H04M 11/04* (2006.01)
*G06F 19/00* (2011.01)
*G01P 3/00* (2006.01)
*G01P 13/00* (2006.01)

(52) U.S. Cl. ...... 702/150; 702/188; 702/189; 455/404.2

(58) Field of Classification Search .................. 702/14, 702/16–18, 56, 70–71, 75, 79–80, 187, 188, 702/189; 455/404.1–404.2, 414.1, 414.3, 455/556.2, 567, 418; 340/539.28, 539.1, 340/901, 905, 539, 531
See application file for complete search history.

(56) References Cited

U.S. PATENT DOCUMENTS

| | | | |
|---|---|---|---|
| 3,914,732 A | 10/1975 | Brumleve et al. | |
| 3,949,353 A | 4/1976 | Waters et al. | |
| 4,152,691 A | 5/1979 | Ward | |
| 5,969,608 A | 10/1999 | Sojdehei et al. | |
| 6,057,549 A * | 5/2000 | Castleman | 250/339.15 |
| 6,208,247 B1 | 3/2001 | Agre et al. | |
| 6,359,582 B1 * | 3/2002 | MacAleese et al. | 342/22 |
| 6,463,387 B1 | 10/2002 | Runnestrand et al. | |
| 6,735,630 B1 | 5/2004 | Gelvin et al. | |
| 6,917,281 B1 | 7/2005 | Goldberg | |

(Continued)

FOREIGN PATENT DOCUMENTS
GB 2112144 A 7/1983

OTHER PUBLICATIONS

Poor, "Wireless Mesh Networks," Feb. 1, 2003, Ember Corp., pp. 1-5.

(Continued)

*Primary Examiner* — Janet Suglo
(74) *Attorney, Agent, or Firm* — BainwoodHuang

(57) ABSTRACT

An explosive device detection system includes sensors and base station that detect and report on suspected improvised explosive device (IED) emplacement activity within the area. When disposed within a geographic area, each sensor forms part of a wireless communications network which allows communication among neighboring sensors. As a sensor detects activity in its proximity, such as activity that indicates emplacement of an IED, the sensor transmits a reporting signal through the network to the base station. The base station is operable to detect if the signals received from the sensors are indicative of IED emplacement activity or some other activity that is not typically associated with IED emplacement activity. In the event that the base station detects activity that is indicative of IED emplacement activity, the base station can direct mobile response units to take immediate responsive action to prevent detonation of the IEDs or apprehend the perpetrators in the act.

24 Claims, 10 Drawing Sheets

90

92 RECEIVE A FIRST SIGNAL FROM A FIRST SENSOR IN THE COMMUNICATIONS NETWORK, THE FIRST SIGNAL INCLUDING A FIRST LOCATION CHARACTERISTIC THAT REPRESENTS A GEOGRAPHIC LOCATION OF THE FIRST SENSOR IN THE COMMUNICATIONS NETWORK AND RECEIVE A SECOND SIGNAL FROM A SECOND SENSOR IN THE COMMUNICATIONS NETWORK, THE SECOND SIGNAL INCLUDING A SECOND LOCATION CHARACTERISTIC THAT REPRESENTS A GEOGRAPHIC LOCATION OF THE SECOND SENSOR IN THE COMMUNICATIONS NETWORK

94 COMPARE THE FIRST LOCATION CHARACTERISTIC OF THE FIRST SENSOR TO SECOND LOCATION CHARACTERISTIC OF THE SECOND SENSOR TO FORM A COMPARISON RESULT

U.S. PATENT DOCUMENTS

| | | |
|---|---|---|
| 6,999,377 B2 | 2/2006 | Burkholder |
| 7,233,781 B2 * | 6/2007 | Hunter et al. ............. 455/404.1 |
| 7,336,079 B2 | 2/2008 | Stolarczyk et al. |
| 7,375,646 B1 | 5/2008 | Diaz-Lopez |
| 7,511,654 B1 | 3/2009 | Goldman et al. |
| 7,512,511 B1 | 3/2009 | Schultz et al. |
| 7,639,178 B1 * | 12/2009 | Mulbrook et al. ............ 342/146 |
| 2003/0067542 A1 | 4/2003 | Monroe |
| 2003/0169335 A1 | 9/2003 | Monroe |
| 2005/0251343 A1 | 11/2005 | Zehavi |
| 2006/0095539 A1 | 5/2006 | Renkis |
| 2006/0229086 A1 | 10/2006 | Broad et al. |
| 2008/0009970 A1 * | 1/2008 | Bruemmer ................... 700/245 |
| 2008/0122634 A1 | 5/2008 | Mardirossian |
| 2008/0129495 A1 | 6/2008 | Hitt |
| 2008/0205324 A1 | 8/2008 | Woosnam |
| 2009/0182525 A1 | 7/2009 | Schultz et al. |

OTHER PUBLICATIONS 1998-2004 Infoage, "Projects: Rembass," www.infoage.org/rembass.html, page created Sep. 2, 1998, total pages 2.

FAS Military Analysis Network, "AN/GSQ-187 Remote Battlefield Sensor System (REMBASS) AN/GSQ-187 Improved Remote Battlefield Sensor System (IREMBASS)," www.fas.org/man/dod-101/sys/land/rembass.htm, pp. 1-6, Feb. 21, 2000.

U.S. Appl. No. 11/697,884, Entitled "Devices and Method for Detecting Emplacement of Improvised Explosive Devices," filed Apr. 9, 2007 by Robert L. Steadman, James Fitzgerald and Mark Litchfield.

U.S. Appl. No. 11/697,899, Entitled "System and Method for Detecting Emplacement of Improvised Explosive Devices," filed Apr. 9, 2007 by Robert L Steadman and James Fitzgerald.

* cited by examiner

80

82 RECEIVE A FIRST SIGNAL FROM A FIRST SENSOR IN THE COMMUNICATIONS NETWORK, THE FIRST SIGNAL INCLUDING A FIRST TIMESTAMP CHARACTERISTIC THAT REPRESENTS A TIME OF THE DETECTED ACTIVITY BY THE FIRST SENSOR AND RECEIVE A SECOND SIGNAL FROM A SECOND SENSOR IN THE COMMUNICATIONS NETWORK, THE SECOND SIGNAL INCLUDING A SECOND TIMESTAMP CHARACTERISTIC THAT REPRESENTS A TIME OF THE DETECTED ACTIVITY BY THE SECOND SENSOR

84 COMPARING THE FIRST TIMESTAMP CHARACTERISTIC OF THE FIRST SIGNAL TO SECOND TIMESTAMP CHARACTERISTIC OF THE SECOND SIGNAL TO FORM A COMPARISON RESULT

┌─────────────────────────────────────────────────────────────┐
│ 92 RECEIVE A FIRST SIGNAL FROM A FIRST SENSOR IN THE │
│ COMMUNICATIONS NETWORK, THE FIRST SIGNAL INCLUDING A FIRST LOCATION CHARACTERISTIC THAT REPRESENTS A GEOGRAPHIC LOCATION OF THE FIRST SENSOR IN THE COMMUNICATIONS NETWORK AND RECEIVE A SECOND SIGNAL FROM A SECOND SENSOR IN THE COMMUNICATIONS NETWORK, THE SECOND SIGNAL INCLUDING A SECOND LOCATION CHARACTERISTIC THAT REPRESENTS A GEOGRAPHIC LOCATION OF THE SECOND SENSOR IN THE COMMUNICATIONS NETWORK │
└─────────────────────────────────────────────────────────────┘
                              ↓
┌─────────────────────────────────────────────────────────────┐
│ 94 COMPARE THE FIRST LOCATION CHARACTERISTIC OF THE FIRST SENSOR TO SECOND LOCATION CHARACTERISTIC OF THE SECOND SENSOR TO FORM A COMPARISON RESULT │
└─────────────────────────────────────────────────────────────┘

```
96 RECEIVE A FIRST SIGNAL FROM A FIRST SENSOR IN THE
COMMUNICATIONS NETWORK, THE FIRST SIGNAL INCLUDING A
FIRST TIMESTAMP CHARACTERISTIC THAT REPRESENTS A TIME OF
THE DETECTED ACTIVITY BY THE FIRST SENSOR AND A FIRST
LOCATION CHARACTERISTIC THAT REPRESENTS A GEOGRAPHIC
LOCATION OF THE FIRST SENSOR IN THE COMMUNICATIONS
NETWORK AND RECEIVE A SECOND SIGNAL FROM A SECOND
SENSOR IN THE COMMUNICATIONS NETWORK, THE SECOND SIGNAL
INCLUDING A SECOND TIMESTAMP CHARACTERISTIC THAT
REPRESENTS A TIME OF THE DETECTED ACTIVITY BY THE SECOND
SENSOR AND THE SECOND SIGNAL INCLUDING A SECOND
LOCATION CHARACTERISTIC THAT REPRESENTS A GEOGRAPHIC
LOCATION OF THE SECOND SENSOR IN THE COMMUNICATIONS
NETWORK
```

↓

```
98 CORRELATE THE FIRST TIMESTAMP CHARACTERISTIC, THE FIRST
LOCATION CHARACTERISTIC, THE SECOND TIMESTAMP
CHARACTERISTIC, AND THE SECOND LOCATION CHARACTERISTIC
TO FORM THE COMPARISON RESULT
```

FIG. 9

BASE STATION AND METHOD FOR DETECTING EMPLACEMENT OF IMPROVISED EXPLOSIVE DEVICES

BACKGROUND

Terrorist-type explosives, such as Improvised Explosive Devices or IEDs, are a source of casualties both in military action and in peacetime. Certain IEDs, such as roadside bombs, are formed of an explosive element, such as one or more 120 mm or 155 mm shells, and a radio controlled detonator. These IEDs are placed along side roadways and typically hidden, buried, or camouflaged. In use, when a triggerman observes a target vehicle traveling toward an emplaced IED, the triggerman remotely detonates the IED using a remote control, thereby causing the IED to explode and cause damage to the target vehicle, injury to the vehicle's personnel, or both.

In order to reduce the risk of an attack by way of the roadside IEDs, military groups typically focus their efforts toward countering the effect of IEDs after emplacement. For example, the military can send personnel and equipment to roadway locations in an attempt to visually detect the presence of IEDs. Once detected, the IEDs can be cleared from the location. The military also utilizes signal jamming techniques to prevent the triggermen from remotely detonating IEDs using the radio controlled detonators. Additionally, the military can increase the amount of armor on military vehicles to limit the potentially destructive effects of the IEDs when detonated in the vehicle's vicinity.

The military also utilizes certain sensor systems to detect movement of personnel and vehicles in a particular area. For example, the Remotely Monitored Battlefield Sensor System (REMBASS) includes remotely monitored sensors placed within a particular geographic location. As personnel enter the area, the sensors detect and locate the personnel within the area and classify the type of personnel, such as wheeled vehicle, tracked vehicle, or pedestrian traffic.

SUMMARY

As described above, the military typically counters IED emplacement efforts after the IEDs have been emplaced within a geographic area using different techniques. However, these techniques suffer from a variety of deficiencies. For example, as described above, the military provides personnel to visually detect the presence of IEDs. However, the enemy can counter this technique by improving the camouflage of the IEDs and increasing the number of IEDs emplaced over a particular geographic area. Also in the case where the military utilizes signal jamming techniques to prevent radio controlled detonators from detonating the IEDs, the enemy can utilize a hard wire remote control or a motion sensor device, such as passive infrared detector, hard wired to the IED. As a vehicle or personnel moves into the detection range of the motion sensor, the motion sensor transmits a signal to the IED, causing it to detonate. Additionally, while the military has added or increased the amount of armor on military vehicles, detonation of larger IEDs, or Explosively Formed Penetrator (EFP) devices, can penetrate the armor plated vehicles and cause damage to the vehicles.

Also as indicated above, the military utilizes sensor systems, such as REMBASS, to detect movement of personnel and vehicles in a particular area. In REMBASS, the sensors typically transmit motion data to a program monitor upon detection of movement within the system. In the case where a REMBASS sensor is located at a relatively large distance away from the program monitor, the sensor requires relatively large amounts of power to successfully transmit the motion data to the monitor, thereby increasing the power requirements of the sensor's power supply and decreasing battery life. Additionally conventional REMBASS program monitors do not discriminate between activities associated with the emplacement of IEDs and "innocent" activities such as the ordinary motion of vehicles or personnel in the vicinity of the sensors. In the case where ordinary pedestrian traffic occurs in proximity to the sensors, in response to the motion data received from the sensors, the program monitor can detect such activity as an IED emplacement activity and generate a false alarm.

In contrast to the conventional IED detection approach, embodiments of the invention are directed to techniques for detecting activity associated with placing an explosive device, such as an IED or landmine, within a particular geographic area. A detection system includes sensors and a base station that detect and report on suspected IED emplacement activity within the area. When disposed within a geographic area, each sensor forms part of a wireless communications network which allows communication among neighboring sensors. As a sensor detects activity in its proximity, such as activity that indicates emplacement of an IED, the sensor transmits a reporting signal through the network to the base station. The base station is operable to detect if the signals received from the sensors are indicative of IED emplacement activity or some other activity (e.g., pedestrian traffic, vehicular traffic) that is not typically associated with IED emplacement activity. Such detection minimizes the generation of improper or false alarm reports for each and every reporting signal that the base station receives from the sensors. In the event that the base station detects activity that is indicative of IED emplacement activity, the base station can direct mobile response units to take immediate responsive action to prevent detonation of the IEDs or apprehend the perpetrators in the act.

In one arrangement, embodiments of the invention relate to a method for detecting placement of an explosive device within a geographic area by a base station. The method includes receiving a signal from at least one sensor in the communications network, the signal including a characteristic that represents a detected activity within a location proximate to the at least one sensor. The method also includes comparing the characteristic of the signal to a baseline characteristic to form a comparison result. Also, the method includes detecting that the characteristic of the signal indicates placement of an explosive device within the geographic area when the comparison result has a first value and that the characteristic of the signal does not indicate placement of an explosive device within the geographic area when the comparison result has a second value. As such, the base station is operable to detect if the signals received from the sensors are indicative of IED emplacement activity or some other activity (e.g., pedestrian traffic, vehicular traffic) that is not typically associated with IED emplacement activity. Such detection minimizes the generation of improper or false alarm reports for each and every reporting signal that the base station receives from the sensors.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

The drawings are not necessarily to scale, emphasis instead being placed upon illustrating the principles of the invention.

FIG. 7 is a flowchart that illustrates the steps performed by the base station when detecting placement of an explosive device, such as an IED, based upon timestamp information FIG. 8 is a flowchart that illustrates the steps performed by the base station when detecting emplacement of an IED, based upon location information.

FIG. 9 is a flowchart that illustrates the steps performed by the multi-node feature extraction function when detecting emplacement of an IED, based upon both location and timestamp information.

DETAILED DESCRIPTION

Embodiments of the invention are directed to techniques for detecting activity associated with placing an explosive device, such as an IED or landmine, within a particular geographic area. A detection system includes sensors and base station that detect and report on suspected IED emplacement activity within the area. When disposed within a geographic area, each sensor forms part of a wireless communications network which allows communication among neighboring sensors. As a sensor detects activity in its proximity, such as activity that indicates emplacement of an IED, the sensor transmits a reporting signal through the network to the base station. The base station is operable to detect if the signals received from the sensors are indicative of IED emplacement activity or some other activity (e.g., pedestrian traffic, vehicular traffic) that is not typically associated with IED emplacement activity. Such detection minimizes the generation of improper or false alarm reports for each and every reporting signal that the base station receives from the sensors. In the event that the base station detects activity that is indicative of IED emplacement activity, the base station can direct mobile response units to take immediate responsive action to prevent detonation of the IEDs or apprehend the perpetrators in the act.

Figure 1:
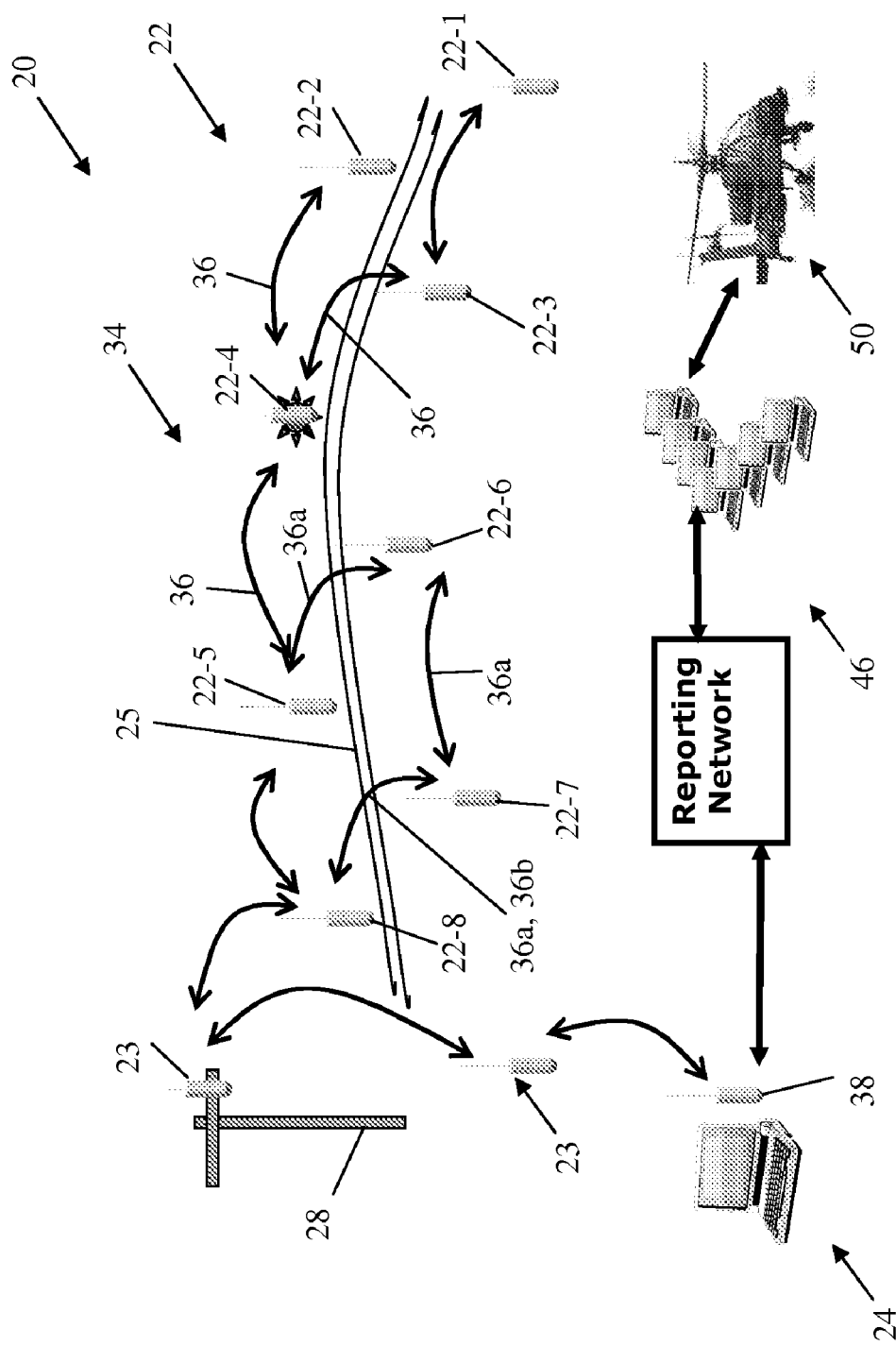
FIG. 1 illustrates a schematic representation of a system for detecting placement of an explosive device within a geographic area.

FIG. 1 illustrates one embodiment of a detection system 20 for detecting placement of an explosive device, such as an IED, within a given geographic area. The detection system 20 includes a set of sensors 22, one or more optional signal repeaters 23, and a base station 24. The system 20 provides substantially continuous monitoring of an area for IED emplacement. For example, the sensors 22 and signal repeaters 23 of the system 20 can be installed within a geographic area, such as along a roadside 25, for surveillance of IED emplacement activity. The base station 24 can be installed within a location remote from the sensors 22 and signal repeaters 23 within the system 20. The system 20 allows detection and reporting of IED emplacement within the geographic area as it occurs. For example, the sensors 22 transmit, to the base station 24, reporting signals 36 that can indicate IED placement activity within the area. Based upon an analysis of the signals 36, the base station 24 or personnel monitoring the base station 24 can direct mobile response units to take responsive action, such as capturing insurgents in the act of emplacement, tracking the insurgents subsequent movements, performing a stake-out at suspected IED sites to apprehend the trigger men, or warning convoys/patrols of suspect locations until the locations are investigated and cleared.

Figure 2B:
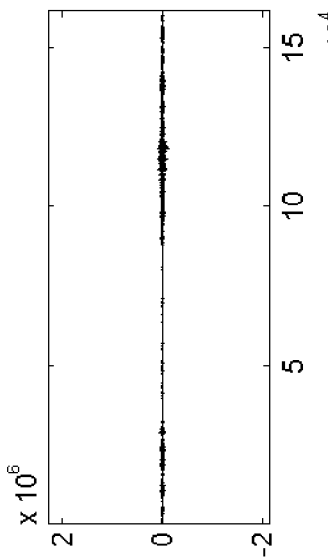
FIG. 2B is a graph showing a first type of vibration activity (e.g., innocent person walking) detected by the sensor of FIG. 2A.
Figure 2C:
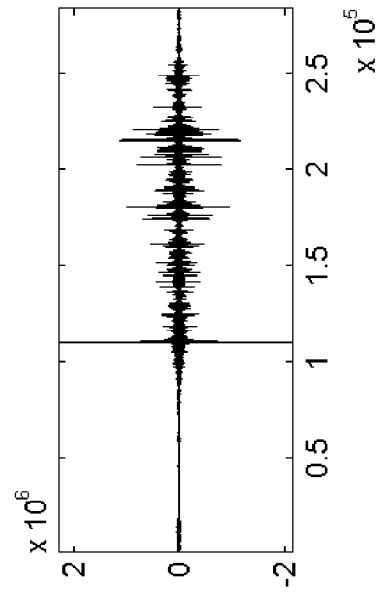
FIG. 2C is a graph showing a second type of vibration activity detected (IED emplacement) by the sensor of FIG. 2A.
Figure 2A:
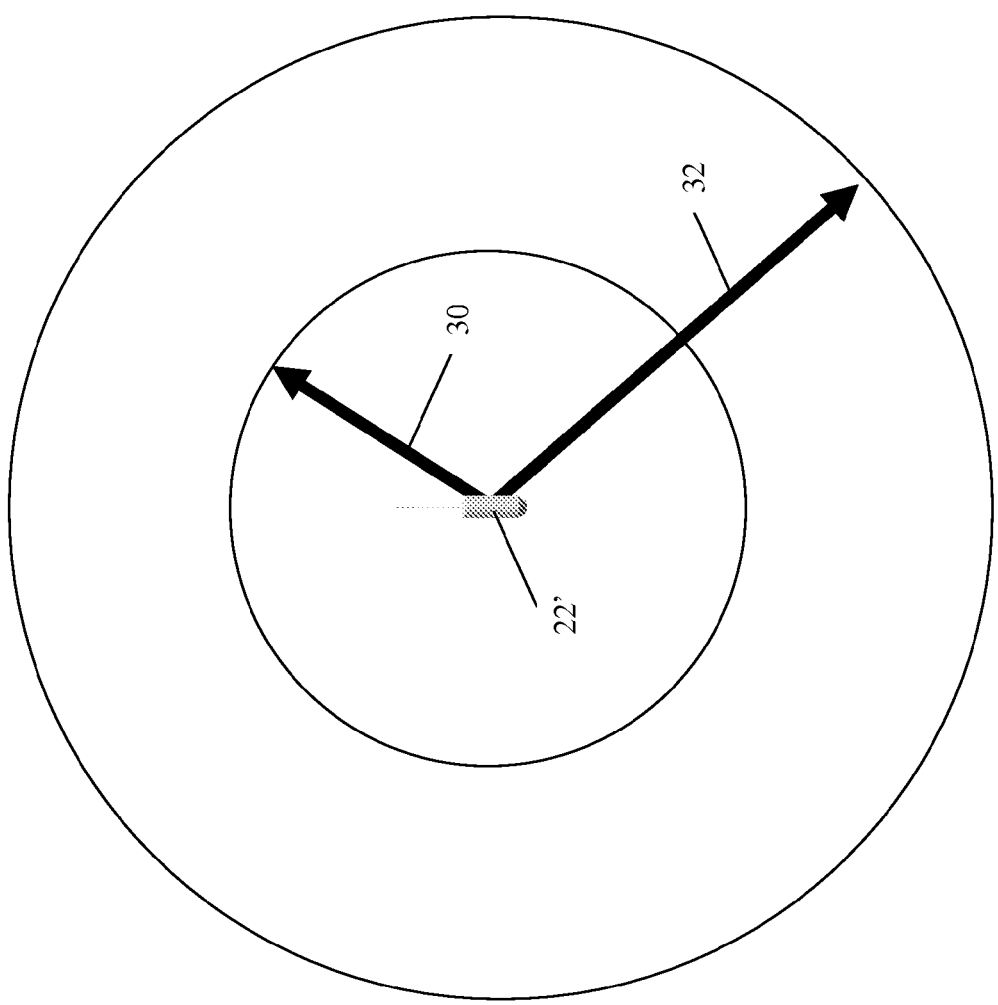
FIG. 2A illustrates a relative detection range of a sensor for innocent activity versus IED emplacement activity of FIG. 1.

In the system 20, each sensor 22 is configured to detect activity within a location in proximity to the sensor 22. In one arrangement, each sensor 22 is configured as a seismic sensor 22 which detects vibrations occurring within a particular distance from the seismic sensor 22. For example, as shown in FIGS. 2A-2C, for an activity that generates vibrations having relatively small amplitudes, such as caused by pedestrians walking as shown in FIG. 2B, the seismic sensor 22' detects such activity within a radius 30 of approximately 25 meters from the seismic sensor 22' and generates a corresponding reporting signal. However, for activity that produces vibrations having relatively larger amplitudes, such as caused by emplacement of an IED within the ground as shown in FIG. 2C, the seismic sensor 22' detects such activity within a radius 32 of considerably greater than 25 meters from the seismic sensor 22' and generates a corresponding reporting signal.

Returning to FIG. 1, each sensor 22 is also configured to generate a local reporting signal 36 in response to the input vibration or signal detected by the sensor 22. In one arrangement, the local reporting signal 36 indicates a characteristic associated with the activity detected in proximity to the sensor 22. For example, the input vibration includes characteristics, such as a maximum vibration amplitude, a frequency, and a duration of the vibration. The reporting signal 36 generated by the sensor 22, provides some indication as to these, and other, characteristics associated with the input vibration. For example, the reporting signal provides a peak amplitude of the vibration signal, an average amplitude of the vibration signal, a signal to noise ratio of the vibration signal, a duration of the vibration signal, Kurtosis of the vibration signal, a spectral ratio of the vibration signal, tonality of the vibration signal, and a timestamp characteristic that indicates the time of day at which the sensor 22 detected the vibration signal. Details of these characteristics are provided below. In another arrangement, the sensor 22 is configured to include a geographic identifier or location characteristic with the local reporting signal 36. For example, the location characteristic provides the base station 24 with an indication as to the geographic origin of the reporting signal.

The sensors 22 form a wireless communications network 34 that allows any single sensor 22 to both send and receive reporting signals 36, as generated by any of the other sensors 22, in order to direct the reporting signals 36 toward the base station 24. For example, each sensor 22 includes a transceiver (not shown) that allows the sensors 22 to transmit and receive wireless reporting signals 36. In one embodiment, the transceivers are configured with a communications protocol, such as the IEEE 802.15.4 protocol or the ZigBee protocol that defines a relatively inexpensive ad-hoc, self-forming, self-healing, multi-hop, mesh network. Such a mesh network forms a "daisy chain" from one sensor 22 to another to expand the relatively short transmission range of one sensor 22 over a relatively larger area and to minimize the amount of power required by the sensor 22 to transmit a signal 36.

With the sensors 22 forming a wireless mesh communications network 34, each sensor 22 within the communication network 34 acts as a relay point for other neighboring sensors 22 to direct reporting signals 36 toward the base station 24. As such, each sensor 22 transmits the signals 36 to a limited number of sensors 22 within the communications network 34. For example, as shown in FIG. 1, a sensor 22-4 detects activity within its proximity, generates a reporting signal, and transmits the signal 36 to neighboring sensors 22-2, 22-3, and 22-5 disposed within its geographic proximity. Each of the neighboring sensors 22-2, 22-3, and 22-5 receives the signal 36 and, in turn, transmits the signal 36 to other geographically proximate sensors to direct the signal 36 toward the base station 24. For example, the sensor 22-5 transmits the reporting signal 36 to neighboring sensors 22-6, 22-7, 22-8 to direct the signal to the base station 24. Sensor 22-3 would not necessarily transmit the reporting signal 36 to sensor 22-1 because the sensor 22-1 is geographically further away from the base station 24 relative to sensor 22-3. The process of transmission and reception of the reporting signal 36 among neighboring sensors 22 continues until the signal 36 reaches the base station 24.

While the sensors 22 within the network are configured to transmit reporting signals 36 received from other sensors 22 within the network, such signals being termed remote reporting signals, each sensor 22 can also transmit local reporting signals generated by the sensor 22 itself. As a result, the sensors 22 provide the base station 24 with a substantially comprehensive view of the overall activity within a geographic area. For example, assume sensor 22-6 generates a local reporting signal 36a that indicates a locally detected activity. The sensor 22-6 then transmits the local reporting signal 36a to neighboring sensors 22-5 and 22-7. Each sensor 22-5, 22-7 receives the signal 36a as remote reporting signals. In the event that one of the sensors 22-5, 22-7, such as sensor 22-7 for example, also detects local activity and generates a local reporting signal 36b, the sensor 22-7 then transmits its local reporting signal 36b along with the reporting signal 36a received from the sensor 22-6 to a neighboring sensor 22-8. This process repeats until the reporting signals reach the base station 24.

In the system 20, the base station 24 is configured to receive reporting signals 36 from the communications network 34. For example, the base station 24 is configured as a computerized device, such as a personal computer or a laptop computer, and includes a receiving element 38 that receives the reporting signals 36 from the sensors 22 or signal repeaters 23 within the network 34. While the receiving element 38 can receive the reporting signals 36 in a variety of formats, in one arrangement, the receiving element 38 is configured as a wireless signal receiver that receives the reporting signals 36 wirelessly.

The base station 24 is operable to detect if the signals 36 received from the sensors 22 are indicative of IED emplacement activity or some other activity (e.g., pedestrian traffic, vehicular traffic) that is not typically associated with IED emplacement activity. For example, as will be described in detail below, the base station 24 can compare a characteristic of one or more of the signals 36 received from the network 34 with an associated baseline characteristic, indicative of IED emplacement activity. For example, the base station 24 can include a memory device that stores multiple baseline characteristics indicative of known IED emplacement activity. Based upon the comparison, the base station 24 can detect whether or not the activity reported by the sensors 22 corresponds to probable IED emplacement activity.

In one arrangement, the base station 24 provides a user or base station operator with a notice to indicate that the activity detected by one or more sensors 22 potentially relates to IED emplacement activity. For example, the base station 24 can display one or more characteristics of the received signal 36 and can indicate to the user that, based upon the analysis of the characteristics, the signal 36 is indicative of IED emplacement activity. At this stage, the user can further assess the signal 36 or characteristics associated with the signal 36 and can make a determination as to the "correctness" of the base station's analysis. For example, based upon the user's analysis of the characteristic, the user can decide that the signal 36 or signal characteristic does correspond to an IED emplacement activity and can allow the base station 24 to proceed and generate a reporting output. Alternately, based upon the user's analysis, the user can decide that the signal 36 or signal characteristic is not indicative of IED emplacement and, as a result, can cause the base station 24 to take no further action. In this arrangement, the base station 24 allows the operator to be involved in the detection of IED emplacement activity detection and the generation of false alarms, thereby minimizing the generation of improper or false alarm reports for each and every reporting signal received from the network 34.

Figure 3:
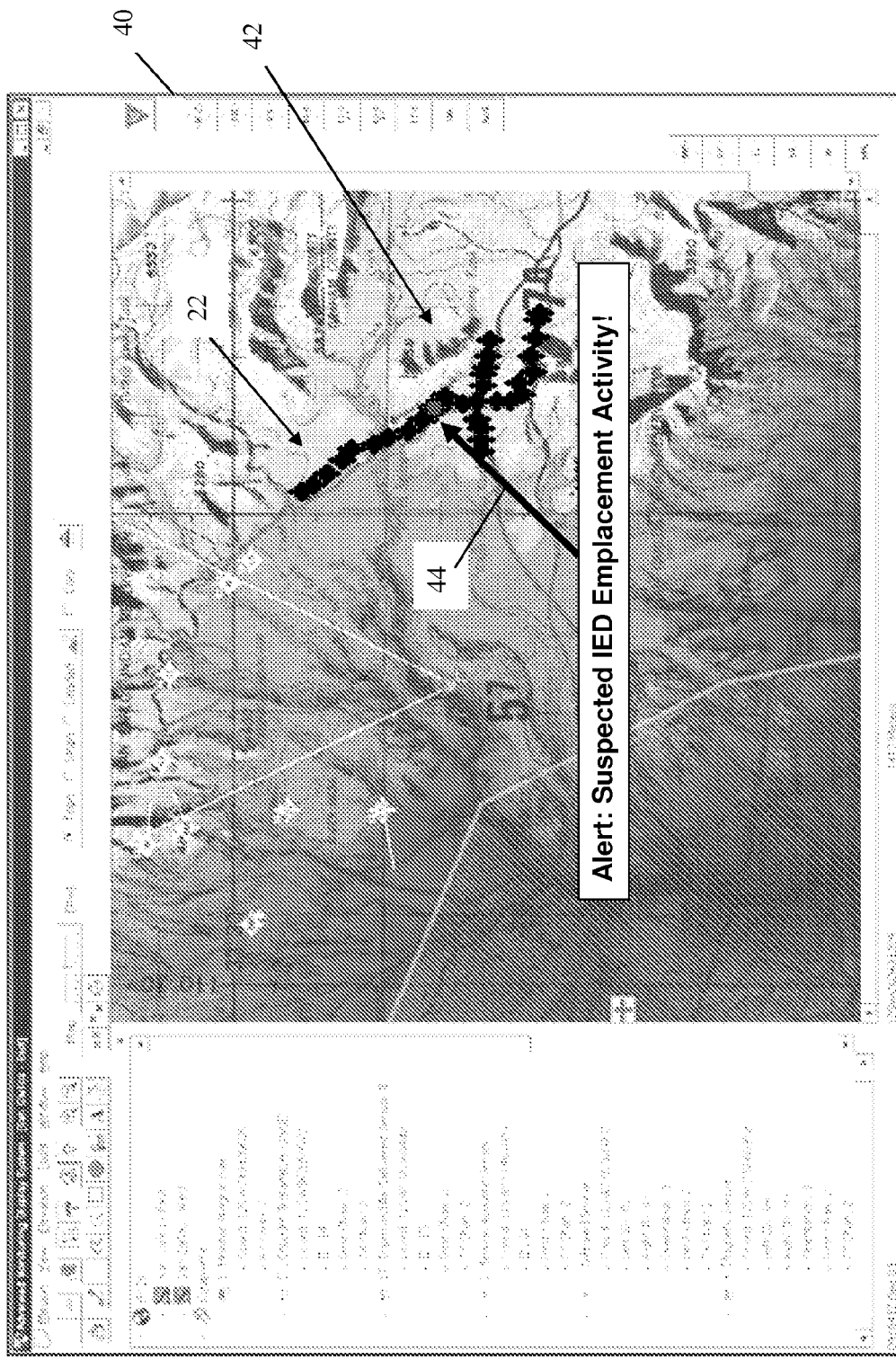
FIG. 3 illustrates an example of a graphic output produced by the base station after detecting suspected IED emplacement activity.

In the case where the base station 24 or its operator detects the reported activity as being indicative of IED emplacement activity, the base station 24 can generate a reporting output to provide an indication regarding suspected IED placement activity within the network 34. In one arrangement, the base station 24 provides the reporting output as a graphical output. For example, as shown in FIG. 3, the base station 24 provides a graphical display 40 that indicates the location of the probable IED emplacement activity. As illustrated, the graphical display 40 shows a topologic representation 42 of a particular geographic area of concern, such as a roadway 42 and the locations of the sensors 22 disposed within the area. Further, the graphical display 40 provides the user with an indication 44, such as by an arrow or other indication, of a particular sensor 22 that has transmitted a reporting signal having characteristic that indicate possible IED placement activity. While the base station 24 can have a variety of configurations to provide reporting output as a graphical display 40, in one arrangement, the base station 24 is configured as a Geographic Information System (GSI) workstation utilizing Commercial Joint Mapping Toolkit (C/JMTK) software to display a geographical representation of an area in which the sensors 22 are disposed and an overlay representing the relative locations of the sensors 22 within the area.

Based upon the graphical output 40, the base station operator can operate the base station 24 to transmit alert information to appropriate response channels for investigation of the detected IED emplacement activity. For example, the base station 24 communicates with a reporting network 46, such as the Force XXI Battle Command, Brigade-and-Below (FBCB2) network, to transmit the alert information to mobile response units 50 for intervention at the activity site. In one arrangement, the base station 24 forms an integrated part of the FBCB2 network 46, as opposed to operating as a separate, stand-alone unit.

Figure 4:
FIG. 4 illustrates an example of a graphic output produced at a mobile response unit, based upon information received from a base station, to aid in locating suspected IED emplacement activity.

While the alert information can have a variety of configurations, FIG. 4 illustrates an example of alert information 52 provided to the mobile response units 50. As illustrated, the alert information 52 provides the response units 50 with information related to the identity of the originating sensor 54, the date and time of the suspected IED placement activity 56, and the location coordinates of the sensor 58. Based on the alert information 52, the response units can take responsive action in a relatively short timeframe, relative to the detection of the suspected IED placement activity.

Figure 5:
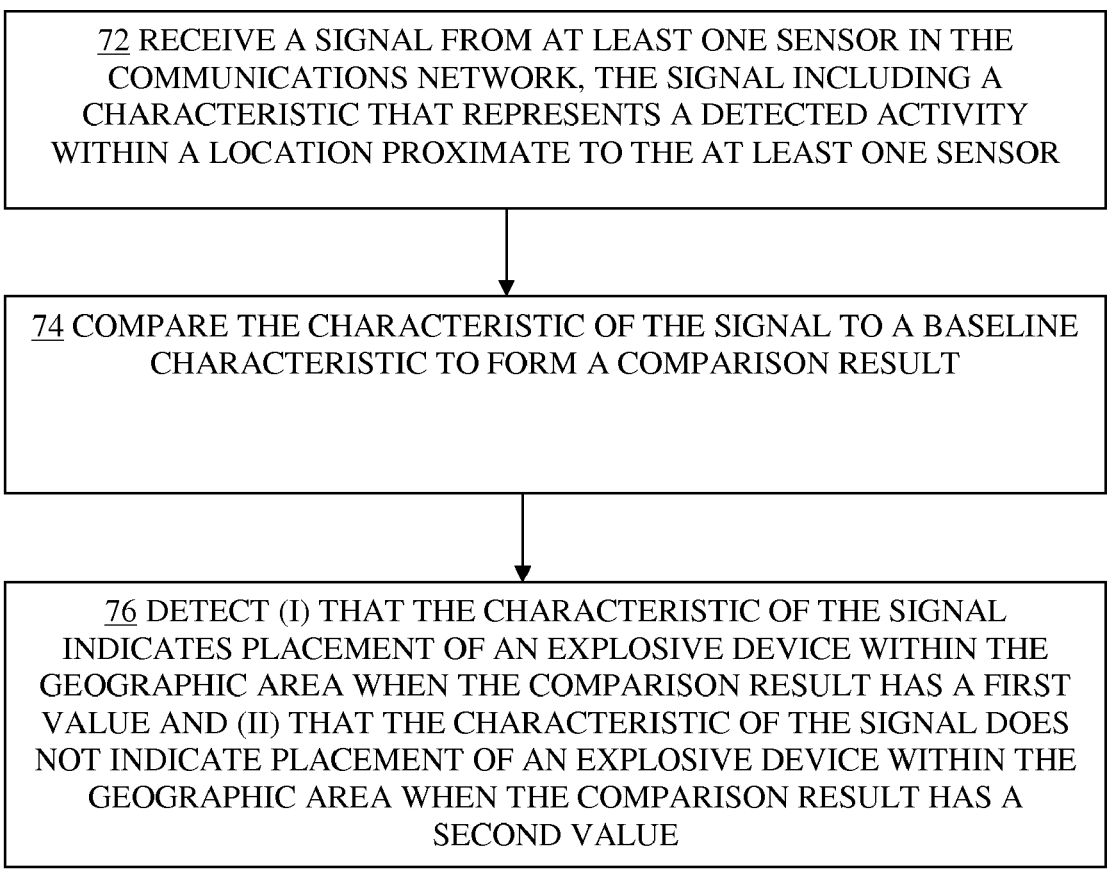
FIG. 5 is a flow chart illustrating a method performed by the system of FIG. 1 for detecting placement of explosives within a geographic area.

FIG. 5 is a flowchart 70 that illustrates the steps performed by the base station 24 when detecting placement of an explosive device, such as an IED, within a geographic area.

In step 72, the base station 24 receives a signal 36 from at least one sensor 22 in the communications network 24, the signal 36 including a characteristic that represents a detected activity within a location proximate to the sensor 22. For example, the base station 24 can receive either local or remote reporting signals 36a, 36b from the sensors 22 within the communications network 34. The signals 36a, 36b, as generated by the sensors 22, include characteristics that are associated with the activity by the sensors 22. For example, the characteristic can indicate a peak amplitude of the vibration signal, an average amplitude of the vibration signal, a signal to noise ratio of the vibration signal, a duration of the vibration signal, Kurtosis of the vibration signal, a spectral ratio of the vibration signal, tonality of the vibration signal, and a timestamp characteristic that indicates the time of day at which the sensor 22 detected the vibration signal.

In step 74, the base station 24 compares the characteristic of the signal 36 to a baseline characteristic to form a comparison result. In one arrangement, the base station 24 stores, as a baseline frequency characteristic within a database, a series of frequency spectrum characteristics that correspond to known frequency spectra as measured during actual IED emplacement. When the base station 24 receives a signal 36 having a vibration frequency characteristic that indicates the frequency of the vibration detected at the sensor 22, the base station 24 compares the vibration frequency characteristic of the signal 36 with the corresponding vibration baseline frequency characteristic.

In step 74, the base station 24 detects that the characteristic of the signal indicates placement of an explosive device within the geographic area when the comparison result has a first value and that the characteristic of the signal does not indicate placement of an explosive device within the geographic area when the comparison result has a second value. For example, assume the case where the base station 24 compares the vibration frequency characteristic of a signal 36 with the corresponding vibration baseline frequency characteristic. In the case where the base station 34 detects that the vibration frequency characteristic of a signal 36 and the vibration baseline frequency characteristic do not substantially match, the base station 24 can detect that the reporting signal 36 from the sensor 22 is not indicative of IED emplacement activity. However, assume the case where the base station 34 detects that vibration frequency characteristic of a signal 36 and the vibration baseline frequency characteristic do substantially match. In such a case, the base station can detect that the reporting signal 36 is indicative of the presence of possible IED emplacement activity in proximity to the sensor 22. As a result of detecting the IED emplacement activity, the base station 24 can then generate a reporting output to provide an alert regarding the suspected IED placement activity within the network 34.

Figure 6:
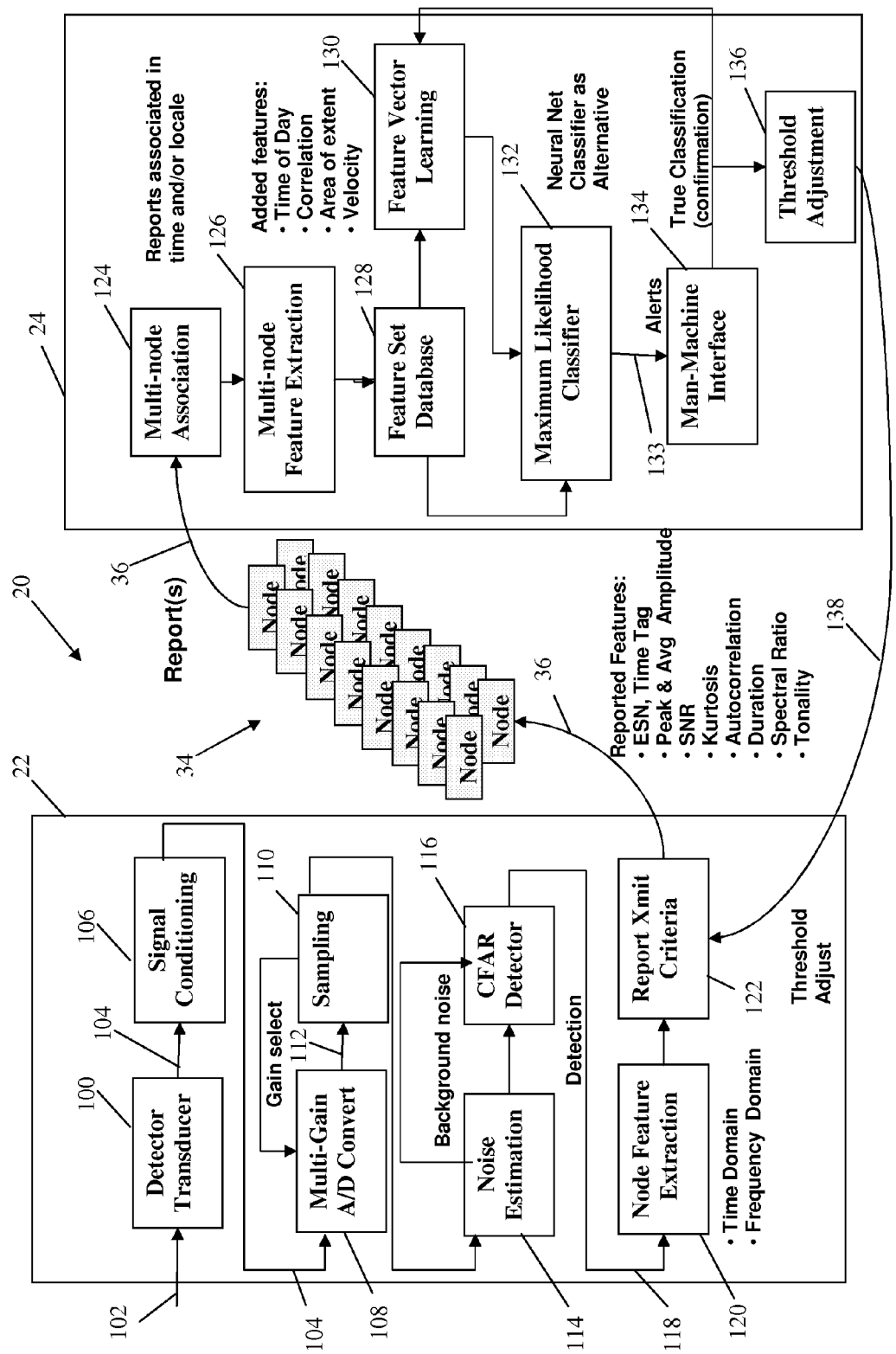
FIG. 6 illustrates a schematic representation of the collection, processing, and flow of reporting signals generated within the system of FIG. 1.

As indicated above, the sensors 22 form part of a communications network 34 and are configured to generate reporting signals 36 that indicate characteristics associated with activity performed in relative proximity to the sensor 22. Also as indicated, the base station 24 is operable to detect the probability of IED emplacement activity based upon a comparison of the characteristic of the signal and a baseline characteristic. FIG. 6 illustrates a schematic representation of the overall generating, collection, processing, and use of the reporting signals, and their associated characteristics, within the system 20, according to one embodiment.

As illustrated, in each sensor 22, a detector or transducer 100 receives an input 102, such as a locally detected activity, from a location in proximity to the sensor 22. For example, in the case where the sensor is configured as a seismic sensor, the transducer receives a vibration from an external source. Based upon the input, the detector 100 generates a signal 104 and transmits the signal 104 to a signal conditioning apparatus 106 which can amplify or perform other signal processing on the signal 104. Next, the signal conditioning apparatus 106 transmits the signal 104 to an analog-to-digital (A/D) converter 108. A sampling apparatus 110 acquires digital signal samples from the A/D converter and transmits the signal to a noise estimation 114 and CFAR (Constant False Alarm Rate) detector 116 to minimize false and nuisance alarms, needless processing and radio transmissions, and wasted power.

The CFAR detector 116 transmits the resulting signal 118 to a feature extraction function 120 where the signal undergoes a detection process. The feature extraction function 120 processes the signal 118 over both the time and frequency domains to generate a reporting signal that indicates a characteristic of the input 102 received by the sensor 22. For example, the characteristics included within the reporting signal includes a time tag associated with the date and time sensor 22 received the input 102, a peak and average amplitude of the signal 118, signal to noise ratio information related to the signal, statistical information, including Kurtosis information related to the signal (e.g., Kurtosis being a statistical measure of the impulsivity of a signal, such as a heavy object being placed on the ground or shovel being driven into the ground), auto correlation information (e.g., auto-correlation being a measure of the periodicity of a signal, such as walking at a steady pace or machinery in operation), signal duration information, spectral ratio information (e.g., spectral ratio being the ratio the signal strength in one frequency band versus another, such as the signal strength in a high frequency band divided by the signal strength in a low frequency band), and tonality information (e.g., tonality being a measure of the sine wave signal strength with or without harmonics that may be observed as peaks in the frequency domain via a Fourier Transform). The sensor 22 then transmits the resulting reporting signal to the network 34 via transmitter 122.

As a result of the processing, the controller 224 generates a reporting signal 36 that indicates a characteristic, such a seismic characteristic associated with the input (e.g., input signal) received by the sensor 22. For example, the reporting signal 36 can include a peak amplitude of a sensor input vibration or signal, an average amplitude of a sensor input signal, a signal to noise ratio of a sensor input signal, a duration of a sensor input signal, kurtosis of a sensor input signal, a spectral ratio of a sensor input signal, tonality of a sensor input signal, and a time of day at which the sensor 22 generated the signal.

When the base station 24 receives the reporting signal 36, prior to generating or transmitting an alert message indicating suspected IED emplacement activity within a particular geographic area, the base station 24 performs an analysis of the reporting signal 36 which takes into account various factors associated with the signal 36. In one arrangement, the base station 24 receives signals 36 from multiple sensors 24 within the network 34 and correlates like characteristics of each of the signals 36 in order to detect the probability that the signals 36 indicate IED emplacement. For example, after the base station 24 receives reporting signals 36 from multiple sensors 22 with the network 34, a multi-node association function 124 correlates certain signal characteristics, such as time or location information associated with the signals, to detect probable IED emplacement activity. Description of the operation of embodiments of the multi-node association function 124 is provided below.

In one arrangement, the multi-node association function 124 correlates timestamp information among sensors 22 in the network 34 to detect probable IED emplacement activity within the network 34. In one arrangement timestamp information relates to the time of day at which a sensor 22 generates a reporting signal. FIG. 7 is a flowchart 80 that illustrates the steps performed by the base station 24 when detecting placement of an explosive device, such as an IED, based upon timestamp information.

In step 82, the base station 24 receives a first signal from a first sensor in the communications network 34 and receives a second signal from a second sensor in the communications network 34 where the first signal includes a first timestamp characteristic that represents a time of the detected activity by the first sensor and the second signal includes a second timestamp characteristic that represents a time of the detected activity by the second sensor. For example, with reference to FIG. 1, the base station 24 is configured to receive reporting signals 36 from multiple sensors 22-1 through 22-8 in the communications network 34 where each of the signals includes a timestamp that indicates to the time that each sensor 22 generated the signal 36.

Returning to FIG. 7, in step 84, the multi-node association function 124 of the base station 24 compares the first timestamp characteristic of the first signal to second timestamp characteristic of the second signal to form the comparison result. The base station 24 or operator can then detect whether the signals 36 generated by the sensors 22 indicate probable IED emplacement activity based upon the comparison result.

For example, with reference to FIG. 1, assume the base station 24 receives a signal from sensor 22-1 having a timestamp T, a signal from sensor 22-2 having a timestamp T+1, and a signal from sensor 22-3 having a timestamp T+2. By comparing the timestamp characteristics of each signal from each sensor, 22-1, 22-2, 22-3, the multi-node association function 124 can detect that the sensors 22 generated signals 36 in a particular sequence and at different times. Because the sensors 22-1, 22-2, 22-3 transmitted reporting signals to the base station 24 in a particular sequence and at sequentially increasing times, the base station 24 can detect motion of an object, such as personnel or a truck, relative to the sensors 22-1, 22-2, 22-3 in the network 34 that is not indicative of IED emplacement. By contrast, assume the base station 24 receives a signal from sensor 22-1 having a timestamp T, a first signal from sensor 22-2 having a timestamp T+1, and a second signal from sensor 22-2 having a timestamp T+2. By comparing the timestamp characteristics of each signal from each sensor, 22-1, 22-2, the multi-node association function 124 can detect the motion of some object from a location proximate to the sensors 22-1 to a location proximate to the second sensor 22-2. Further, the base station 24 can detect that with subsequent activity occurring in proximity to the second sensor 22-2 at a later time, the activity is indicative of IED emplacement.

As indicated above, the multi-node association function 124 can also correlate location information among sensors 22 in the network 34 to detect probable IED emplacement activity within the network 34. For example, the location information relates to the relative geographic location of the sensor 22 within the network 34. FIG. 8 is a flowchart 90 that illustrates the steps performed by the base station 24 when detecting emplacement of an IED, based upon location information.

In step 92, the base station 24 receives a first signal from a first sensor in the communications network 34 and receives a second signal from a second sensor in the communications network where the first signal includes a first location characteristic that represents a geographic location of the first sensor in the communications network 34 and the second signal includes a second location characteristic that represents a geographic location of the second sensor in the communications network 34. For example, with reference to FIG. 1, the base station 24 is configured to receive reporting signals 36 from multiple sensors 22-1 through 22-8 in the communications network 34 where each signal 36 includes information that identifies the relative location or coordinates of the sensors 22-1 through 22-8 within the network 34.

Returning to FIG. 8, in step 94, the multi-node association function 124 of the base station 24 compares the first location characteristic of the first sensor to second location characteristic of the second sensor to form a comparison result. Based upon the comparison result, the base station 24 or operator can then detect whether the signals indicate probable IED emplacement activity.

For example, with reference to FIG. 1, assume the base station 24 first receives a signal from sensor 22-1 having a first location characteristic that indicates positioning of the sensor 22-1 at a perimeter of the communications network 34. Further assume that the base station 24 next receives a signal from sensor 22-2 having a second location characteristic that indicates a position of the sensor 22-2 at location within the communications network 34 that is geographically closer to the base station 24 relative to the first sensor 22-1. By comparing the first and second location characteristics of the signals from each of the sensors 22-1, 22-2, the multi-node association function 124 can detect movement of an object relative to the sensors 22-1, 22-2. With such movement of the object in the network 34, the base station 24 can detect such activity as not being indicative of IED emplacement but rather as indicative, for example, of general pedestrian traffic within the network. By contrast, assume the base station 24 first receives a signal from the sensor 22-1 having a first location characteristic that indicates the positioning of the sensor 22-1 at the periphery of the communications network 34. Further assume that the base station 24 then receives an additional signal from the sensor 22-1 having the first location characteristic. By comparing the location characteristics of each signal from the same sensor 22-1, the base station 24 can detect that there is little to no motion of an object in proximity to the sensor 22-1. Because the detected activity is localized relative to a single sensor 22-1, the base station 24 can detect that the activity is indicative of IED emplacement.

The base station 24 also includes additional elements used to detect the possibility that a signal 36 received from the network 34 is indicative of IED emplacement. For example, the base station 24 includes a multi-node feature extraction function 126 which analyzes a combination of the timestamp information and the location information associated with the signals received from the network 34 to detect additional characteristics associated with the signals 36 that can be indicative of IED emplacement activity.

In one arrangement, the multi-node feature extraction function 126 is configured to correlate location information and timestamp information associated with the signals 36 in order to detect the velocity of an object traveling within the network 34. Based upon the velocity, the multi-node association function 124 can detect whether or not the signals 36 received from the network 34 correspond to probable IED emplacement activity. FIG. 9 is a flowchart 95 that illustrates the steps performed by the multi-node feature extraction function 126 when detecting emplacement of an IED, based upon both location and timestamp information.

In step 96, the bases station 24 receives a first signal from a first sensor in the communications network 34 where the first signal includes a first timestamp characteristic that represents a time of the detected activity by the first sensor and a first location characteristic that represents a geographic location of the first sensor in the communications network 34. The base station 24 also receives a second signal from a second sensor in the communications network 34, the second signal including a second timestamp characteristic that represents a time of the detected activity by the second sensor and the second signal including a second location characteristic that represents a geographic location of the second sensor in the communications network 34. For example, with reference to FIG. 1, the base station 24 can receive reporting signals 36 from multiple sensors 22-1 through 22-8 in the communications network 34 where each signal 36 includes information indicating the relative location of the sensors 22-1 through 22-8 within the network 34 (e.g., relative to the base station 24) and where each signal 36 includes information indicating the time at which a respective sensor 22 generated the signal.

Returning to FIG. 9, in step 98 the multi-node feature extraction function 126 correlates the first timestamp characteristic, the first location characteristic, the second timestamp characteristic, and the second location characteristic to form a comparison result. In one arrangement, as indicated above, correlation of these characteristic indicates, as the comparison result, the velocity of an object traveling through the communications network 34. For example based on the first and second location characteristics, the multi-node feature extraction function 126 can calculate the distance between two sensors that produce the corresponding first and second signals. Also, based upon the first and second timestamp characteristics, the multi-node feature extraction function 126 can calculate a difference in the times at which the two sensors generated the corresponding first and second signals. The ratio of the difference in distance and the difference in times relates to the velocity of the object.

Based upon the resultant velocity (e.g., the comparison result), the multi-node feature extraction function 126 can detect the probability of IED emplacement activity within the network based upon a comparison of the resultant velocity with some relative velocity measurement. For example, when the comparison result has a relatively small velocity value (e.g., 0.1 mph), the base station 24 can detect that an object has slowed or stopped within the network 34 thereby indicating the possibility of IED emplacement activity. By contrast, when the comparison characteristic has a relatively large velocity value (e.g., 30 mph), the base station 24 can detect that the object has not stopped in the network 34 thereby indicating that no IED emplacement activity has occurred.

As described above, the multi-node feature extraction function 126 analyzes both the timestamp information and the location information associated with the signals received from the network 34 to detect a velocity of an object within the network 34 as an indication of possible IED emplacement activity. In one arrangement, the multi-node feature extraction function 126 can analyze either the timestamp information or the location information to detect additional characteristics associated with the signals 36 that can be indicative of IED emplacement activity.

Returning to FIG. 6, in one arrangement, the multi-node feature extraction function 126 is configured to analyze the time of day at which the sensor 22 generated the reporting signal 36, based upon the timestamp characteristic, to detect the probability that the reporting signal 36 indicates IED emplacement activity. Typically, IED emplacement activity occurs at nighttime when the IED emplacement personnel are less likely to be visually detected. Therefore, in the case where the multi-node feature extraction function 126 analyzes a signal's timestamp characteristic that indicates a sensor 22 transmitted the signal during the daytime (e.g., during daylight hours), the function 126 can detect the signal 36 as having a low probability of indicating IED emplacement activity. In the case where the multi-node feature extraction function 126 analyzes a signal's timestamp characteristic of that indicates a sensor 22 transmitted the signal during the nighttime, the function 126 can detect the signal 36 as having a high probability of indicating IED emplacement activity.

In one arrangement, the multi-node feature extraction function 126 is also configured to detect possible IED emplacement activity by analyzing the differences between the times that a particular sensor 22 (e.g., from a particular geographic location) generates multiple signals 36. For example, IED emplacement typically occurs in proximity to one sensor 22 or a small subset of sensors 22 within the network 34. In the case where the multi-node feature extraction function 126 detects that sequential reporting signals 36 from a particular sensor 22 were generated over a small timeframe (e.g., a few seconds or a few minutes), the function 126 can detect the signal 22 as being indicative of IED emplacement activity. However, in the case where the multi-node feature extraction function 126 detects that sequential reporting signals 36 from a particular sensor 22 were generated over a relatively large window of time (e.g., a several minutes to a few hours), the function 126 can detect the signal 22 as not being indicative of IED emplacement activity but instead being indicative of other activity (e.g., pedestrian traffic) in proximity to the sensor 22.

In another arrangement, the multi-node feature extraction function 126 is configured to analyze the location of the sensor 22 generating the signal 36, relative to its geographic location within the communications network 34, to detect the probability that the reporting signal 36 indicates IED emplacement activity. Typically, IED emplacement activity occurs in relatively close proximity to a roadside 25. Therefore, with reference to FIG. 1, assume the case where a sensor 22-7 that is disposed at a relatively large distance from the roadside 25 generates a signal 36 and transits the signal to the base station 24. When the multi-node feature extraction function 126 analyzes the signal's location characteristic, the function 126 can detect, based upon the location of the sensor 22-7 within the network 34, that the sensor 22-7 is located at a distance from the roadside 25. As such, the function 126 can detect the signal 36 as having a low probability of indicating IED emplacement activity. By contrast and with reference to FIG. 1, assume the case where a sensor 22-5 that is disposed in relatively close proximity to the roadside 25 generates a signal 36 and transits the signal to the base station 24. When the multi-node feature extraction function 126 analyzes the signal's location characteristic, the function 126 can detect, based upon the location of the sensor 22-5 within the network 34, that the sensor 22-5 is located relatively close to the roadside. As such, the function 126 can detect the signal 36 as having a high probability of indicating IED emplacement activity.

In another arrangement, the multi-node feature extraction function 126 is configured to analyze location information from signals 36 received by the base station 24 to detect if the signals 36 were sequentially transmitted from a single sensor 22 or from multiple sensors 22 in the network 34. For example, IED emplacement typically occurs in a single location for a given duration of time. As a result, the IED emplacement can cause a sensor 22 to generate multiple reporting signals 36. Therefore, assume the case where the base station 24 receives multiple, sequential reporting signals 36 from a single sensor 22 and the function 126 detects that the signals 36 originate from a single sensor 22. Based upon such detection, the multi-node feature extraction function 126 can detect the signals 36 as having a high probability of indicating IED emplacement activity.

Returning to FIG. 6, the base station 24 also includes additional elements used to analyze the reporting signals 36 prior to generating or transmitting an alert message. For example, the base station 24 includes a feature set data base 128, a feature vector learning function 130, an activity classifier function, such as a maximum likelihood classifier function 132, and a man-machine interface 134.

The feature set database 128, in one arrangement, stores baseline characteristics for certain known characteristics associated with IED emplacement activity. For example, the feature set database 128 stores baseline characteristics related to a peak amplitude of a vibration signal, an average amplitude of the vibration signal, a signal to noise ratio of the vibration signal, a duration of the vibration signal, Kurtosis of the vibration signal, a spectral ratio of the vibration signal, and a tonality of the vibration signal where the vibration signal is caused by actual IED emplacement activity (e.g., hole digging, dropping of an IED into the hole).

The maximum likelihood classifier function 132 is configured to compare characteristics of the reporting signals 36 with the baseline characteristics stored in the feature set data base 128 to detect probable IED emplacement activity. For example, when the base station 24 receives a signal 36 from the network 34, as indicated above, the signal 36 includes several characteristics of an input or vibration signal. When base station 24 receives the signal 36, the maximum likelihood classifier 132 retrieves one or more baseline characteristics, such as the peak amplitude baseline characteristic, from the feature set database 128 and compares the baseline characteristic to a corresponding, selected characteristic of the signal 36 to form a comparison result. For example, in the case where the base station 24 is reviewing a peak amplitude characteristic of a signal 36, the maximum likelihood classifier function 132 retrieves the corresponding peak amplitude characteristic from the database 12 and compares the characteristics to each other to form a comparison result. In the case where the comparison result indicates a substantial match or correspondence between the baseline characteristic and the selected characteristic of the signal 36, the maximum likelihood classifier function 132 can detect that the signal 22 indicates probable IED emplacement activity within the network 34. In the case where the comparison result indicates a substantial mismatch or substantially no correspondence between the baseline characteristic and the selected characteristic of the signal 36, the maximum likelihood classifier function 132 can detect that the signal 22 is not indicative of IED emplacement activity within the network 34.

While the activity classifier function 132 can be configured to compare selected characteristics of a signal 36 with a baseline characteristic to detect if the signal 36 indicates probable IED emplacement activity, the activity classifier function can also be configured to perform a statistical analysis of the characteristics of signals received from the sensors 22 in the network to detect probable IED emplacement activity. In one arrangement, the activity classifier function is configured to analyze histograms, first and second order statistics, and mean and covariance values of like characteristics for signals 36 received by the base station 24 to detect whether or not the signals 36 are indicative of IED emplacement activity. For example, high amplitude aperiodic impulsive signals persistent over a certain interval and within a confined area may indicate a high probability of IED emplacement activity independent of a direct comparison to a baseline characteristic.

In another arrangement, the activity classifier function 132 is configured to correlate at least two selected characteristics of the signal 36 to form a comparison result that is indicative of IED emplacement activity within the network 34. In one arrangement, for multiple signals received, the activity classifier function 132 correlates selected signal characteristics with each other to detect the probability that the signal relates to IED emplacement activity. Based upon the correlation of the signal characteristics, the activity classifier function 132 can detect if the signals 36 are indicative of IED emplacement activity.

Figure 10:
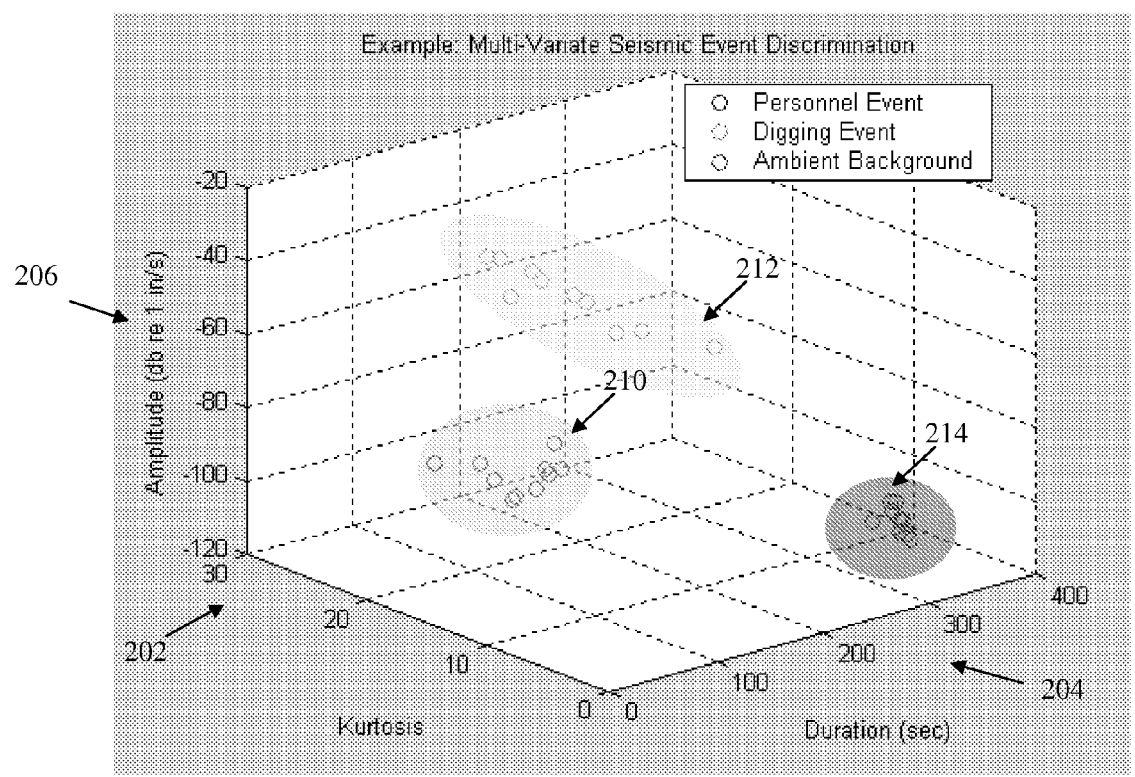
FIG. 10 is a graph that represents the correlation performed by the base station among three characteristics of multiple input signals received from the network sensors.

For example, FIG. 10 is a graph 200 that represents the correlation performed by the activity classifier function 132 among three characteristics of multiple input signals received from the network sensors 22. For example, as shown, the activity classifier function 132 correlates the Kurtosis characteristic of an input signal 202, the duration characteristic of the input signal 204, and the amplitude of the input signal 206 for multiple input signals received by the base station 24. Based upon the correlation among the three characteristics, the correlated characteristics fall into particular decision boundaries or zones. The activity classifier function 132 detects whether a group of signals received from the network 34 are indicative of IED emplacement activity based upon the zone or decision boundary into which the correlated characteristics fall. For example, as illustrated, the graph 200 includes three zones: a personnel event zone 210 indicative of personnel movement within the network, a digging event zone 212 indicative of digging such as for IED emplacement, and an ambient background zone 214 indicative of background noise within the network. In the case where the base station 24 receives signals 36 from one or more sensors in the network 34, the activity classifier function 132 correlates the Kurtosis characteristic 202, the duration characteristic 204, and the amplitude 206 of the input signals. When the correlated characteristics fall within the personnel event zone 210, the activity classifier function 132 can detect the signals as being indicative of personnel movement within the network not indicative of IED emplacement activity. When the correlated characteristics fall within the digging event zone 212, the activity classifier function 132 can detect the signals as being indicative of IED emplacement activity. When the correlated characteristics fall within the ambient background zone 214, the activity classifier function 132 can detect the signals as being indicative of background noise not indicative of IED emplacement activity.

As indicated above, the multi-node association function 124, the multi-node feature extraction function 126, and the activity classifier function 132 are operable to detect the probability of IED emplacement activity within the geographic area covered by the network 34. In one arrangement, these functions 124, 126, 132 provide an output 133 to the man-machine interface 134, such as a computer terminal or display, to allow a base station operator to review the output 133 prior to the base station 24 issuing a reporting output to the reporting network 46. For example, the base station 24 can display one or more characteristics of the received signal 36 and can indicate to the user that, based upon the analysis of the signal 36, the characteristic is indicative of IED emplacement activity. At this stage, the user can further assess the characteristic and can make a determination as to the "correctness" of the base station's analysis. Based upon the user's analysis of the output 133, the user can decide that the output 133 does correspond to an IED emplacement activity and can allow the base station 24 to proceed and generate a reporting output or alarm. Alternately, based upon the user's analysis, the user can decide that the output 133 is not indicative of IED emplacement and, as a result, can cause the base station 24 to take no further action. In this arrangement, the base station 24 allows the operator to be involved in the detection of IED emplacement activity detection, thereby minimizing the generation of false alarms, thereby minimizing the generation of improper or false alarm reports for each and every reporting signal received from the network 34.

Additionally, the feature learning vector function 130 is used to improve the performance of the system 20. For example, when an observed feature vector, such as a selected characteristic associated with a signal 36, is confirmed by the base station operator as being either IED emplacement activity or some other activity, then the selected feature associated with the true classification (e.g., the IED emplacement activity) is stored in the feature set database. The activity classifier function 132 can then utilize the updated information in the feature learning vector function 130, thereby improving future performance based on past data.

As indicated above, the sensors 22 are configured to communicate with the base station 24 via the wireless network 34. In one arrangement, the base station 24 is configured to communicate with the sensors 22 via the network 34 and can transmit programming information to each of the sensors 22 to adjust operation parameters of the sensors 22. As illustrated in FIG. 6, the base station 24 includes a threshold adjustment mechanism 136 configured to transmit a signal 138 to one or more sensors 22 to adjust a detection threshold of the sensors 22. For example, assume the detection threshold of a sensor 22 was set such that any activity in proximity to the sensor 22 (e.g., pedestrian foot traffic, vehicular traffic) would cause the sensors 22 to transmit a reporting signal that included characteristics indicating possible IED placement activity. In such a case, the base station 24 can remotely reconfigure the detection threshold sensors 22 via the signal 138 to decrease the detection sensitivity of the sensor 22. In another example, the base station 24 can adjust the detection threshold of the sensors 22 during expected high activity periods such as during relatively quiet times (e.g. late night).

While this invention has been particularly shown and described with references to preferred embodiments thereof, it will be understood by those skilled in the art that various changes in form and details may be made therein without departing from the spirit and scope of the invention as defined by the appended claims.

For example, as illustrated in FIG. 1, the communications network 34 includes eight sensors 221 through 22-8 that provide IED or explosive device emplacement detection within a geographic area. Such illustration is by way of example only. In one arrangement, the communications network 34 can include any number of sensors to provide emplacement detection over a relatively large geographic area. For example, in the case where the sensors 22 form a mesh network, up to 64,000 sensors can be disposed within a geographic area for IED emplacement detection.

For example, as described above, in one embodiment, the sensors 22 in the system 20 are configured as seismic sensors. Such description is by way of example only. In one arrangement, the sensors 22 can be configured as other types of activity detectors as well. For example, the sensors can be configured as visual or thermal video sensors, infrared thermal sensors, acoustic sensors, radar devices, magnetic sensors, pressure sensors, radio frequency sensors, metal detectors, chemical trace sensors, or MEMS accelerometers.

As indicated above, the base station 24 provides feedback to the sensors 22 in the network to adjust the sensor's sensitivity. However, the base station 24 can also provide other types of feedback to control different parameters and operating characteristics of the sensors 22.

In one arrangement, the base station 24 is also configured to control the amount of power consumed by the sensors 22 based upon environmental and geographic conditions. For example, as indicated above, typical IED emplacement activity may occur primarily at nighttime. To conserve power when the sensors 22 are least likely to sense an IED emplacement activity, the base station 24 can be configured to send a "power off" command to the sensors 24 in the network 34 to turn off one or more of the sensors 22 during the daylight hours and to send a "power on" command to the sensors 22 to cause the sensors 22 to resume detection activity during nighttime hours. In another example, IED emplacement activity typically occurs along a roadside. However, sensors 22 of the communications network 34 can be distributed within a relatively large geographic area such that certain sensors 22 are disposed within relatively close proximity (e.g. 25 meters) to a roadside while other sensors 22 are disposed at locations that are at a relatively large distance (e.g., greater than 25 meters) from the roadside. To conserve power among a subset of the sensors 22 in the network 34, the base station 24 can transmit a "power off" command to the sensors 22 that are not near the roadside while maintaining the sensors 22 located in proximity to the roadside in an "on" mode of operation.

In another arrangement, and with reference to FIG. 6, the base station 24 can also transmit commands to the sensor nodes 22 to cause the sensors 34 to consider reports received from nearby peer sensors prior to transmitting the reports within the network. For example, each sensor can include a peer correlation function (not shown) configured to detect redundancy of a report in the network 34, relative to other reports generated in the network 34, prior to transmitting the report. As such, by limiting the transmission of redundant reports, the base station 24 limits wasting of power by the sensors 22 sending redundant reports.

As indicated above, after the base station 24 receives reporting signals 36 from multiple sensors 22 with the network 34, the multi-node association function 124 correlates certain signal characteristics, such as time or location information associated with the signals, to detect probable IED emplacement activity. It should be understood that the multi-node association function can correlate other signal characteristics as well. For example, the multi-node association function 124 can correlate signal characteristic can indicate a peak amplitude of an input vibration signal, an average amplitude of the vibration signal, a signal to noise ratio of the vibration signal, a duration of the vibration signal, Kurtosis of the vibration signal, a spectral ratio of the vibration signal, and a tonality of the vibration signal to detect probable IED emplacement activity.

What is claimed is:

1. In a base station of a communications network, a method for detecting placement of an explosive device within a geographic area, comprising:

receiving, by the base station, a signal from at least one sensor in the communications network, the signal including a characteristic that represents a detected activity within a location proximate to the at least one sensor;

comparing, by the base station, the characteristic of the signal to a baseline characteristic to form a comparison result; and detecting, by the base station, (i) that the characteristic of the signal indicates placement of an explosive device within the geographic area, prior to detonation of the explosive device, when the comparison result has a first value and (ii) that the characteristic of the signal does not indicate placement of an explosive device within the geographic area when the comparison result has a second value;

receiving comprises (i) receiving, by the base station, a first signal from a first sensor in the communications network, the first signal including a first location characteristic that represents a geographic location of the first sensor in the communications network and (ii) receiving, by the base station, a second signal from a second sensor in the communications network, the second signal including a second location characteristic that represents a geographic location of the second sensor in the communications network;

comparing comprises further comparing, by the base station, the first location characteristic of the first sensor to second location characteristic of the second sensor to form the comparison result;

comparing, by the base station, the first location characteristic of the first sensor to second location characteristic of the second sensor to form the comparison result comprises comparing, by the base station, the first location characteristic of the first sensor to second location characteristic of the second sensor to detect a level of movement of an object relative to the first sensor and the second sensor; and detecting, by the base station, (i) that the characteristic of the signal indicates placement of an explosive device within the geographic area when the comparison result has a first value and (ii) that the characteristic of the signal does not indicate placement of an explosive device within the geographic area when the comparison result has a second value comprises detecting, by the base station, (i) that the level of movement of the object relative to the first sensor and the second sensor indicates placement of an explosive device within the geographic area when the level of movement indicates movement in proximity to one of the first sensor and the second sensor and (ii) that the level of movement of the object relative to the first sensor and the second sensor does not indicate placement of an explosive device within the geographic area when the level of movement indicates movement in proximity to both of the first sensor and the second sensor.

2. The method of claim 1, comprising generating, by the base station, a reporting output in response to detecting that the characteristic of the signal indicates placement of the explosive device within the geographic area.

3. The method of claim 2, wherein generating, by the base station, the reporting output comprises generating a graphical output showing a representation of the geographic area and a location of the at least one sensor generating the reporting signal.

4. The method of claim 1, wherein:

receiving comprises (i) receiving, by the base station, a first signal from a first sensor in the communications network, the first signal including a first timestamp characteristic that represents a time of the detected activity by the first sensor and (ii) receiving, by the base station, a second signal from a second sensor in the communications network, the second signal including a second timestamp characteristic that represents a time of the detected activity by the second sensor; and comparing comprises further comparing, by the base station, the first timestamp characteristic of the first signal to second timestamp characteristic of the second signal to form the comparison result.

5. The method of claim 1, wherein receiving comprises (i) receiving, by the base station, a first signal from a first sensor in the communications network, the first signal including a first timestamp characteristic that represents a time of the detected activity by the first sensor and a first location characteristic that represents a geographic location of the first sensor in the communications network and (ii) receiving a second signal from a second sensor in the communications network, the second signal including a second timestamp characteristic that represents a time of the detected activity by the second sensor and the second signal including a second location characteristic that represents a geographic location of the second sensor in the communications network; and comparing comprises correlating, by the base station, the first timestamp characteristic, the first location characteristic, the second timestamp characteristic, and the second location characteristic to form the comparison result.

6. The method of claim 5, wherein:

correlating, by the base station, the first timestamp characteristic, the first location characteristic, the second timestamp characteristic, and the second location characteristic to form the comparison result comprises correlating, by the base station, the first timestamp characteristic, the first location characteristic, the second timestamp characteristic, and the second location characteristic to detect a velocity of an object within the communications network; and detecting, by the base station, (i) that the characteristic of the signal indicates placement of an explosive device within the geographic area when the comparison result has a first value and (ii) that the characteristic of the signal does not indicate placement of an explosive device within the geographic area when the comparison result has a second value comprises detecting, by the base station, (i) that the velocity of the object within the communications network indicates placement of an explosive device within the geographic area when the velocity has a first value and (ii) that the velocity of the object within the communications network does not indicate placement of an explosive device within the geographic area when the velocity has a second value.

7. The method of claim 1, wherein the characteristic of the signal is selected from a group consisting of: a peak amplitude of a sensor input vibration, an average amplitude of a sensor input vibration, a signal to noise ratio of a sensor input vibration, a duration of a sensor input vibration, Kurtosis of a sensor input vibration, a spectral ratio of a sensor input vibration, tonality of a sensor input vibration, and a time of day at which the sensor generated the signal.

8. The method of claim 7, wherein comparing comprises correlating, by the base station, at least two selected characteristics of the signal to form the comparison result.

9. The method of claim 1, wherein comparing comprises:
retrieving, by the base station, the baseline characteristic, corresponding to a selected characteristic of the signal, from a database of baseline characteristics; and
comparing, by the base station, the selected characteristic of the signal to the baseline characteristic for the selected characteristic to form the comparison result.

10. The method of claim 9, comprising storing, by the base station, the selected characteristic as the corresponding baseline characteristic in the database based upon the comparison result.

11. The method of claim 1, comprising adjusting, by the base station, a detection threshold associated with the at least one sensor of the communication network to adjust a detection sensitivity of the at least one sensor.

12. The method of claim 1, wherein receiving, by the base station, the signal from the at least one sensor in the communications network, the signal including the characteristic that represents the detected activity within a location proximate to the at least one sensor comprises receiving, by the base station, the signal from the at least one sensor via wireless communications over the communications network, the at least one sensor being distinct from the base station.

13. A base station of a communications network, the base station operable to detect placement of an explosive device within a geographic area, the base station having a signal analyzer configured to:
receive a signal from at least one sensor in the communications network, the signal including a characteristic that represents a detected activity within a location proximate to the at least one sensor;
compare the characteristic of the signal to a baseline characteristic to form a comparison result; and
detect (i) that the characteristic of the signal indicates placement of an explosive device within the geographic area, prior to detonation of the explosive device, when the comparison result has a first value and (ii) that the characteristic of the signal does not indicate placement of an explosive device within the geographic area when the comparison result has a second value;
when receiving the signal from at least one sensor in the communications network, the signal analyzer is configured to (i) receive a first signal from a first sensor in the communications network, the first signal including a first location characteristic that represents a geographic location of the first sensor in the communications network and (ii) receive a second signal from a second sensor in the communications network, the second signal including a second location characteristic that represents a geographic location of the second sensor in the communications network;
when comparing the characteristic of the signal to the baseline characteristic to form the comparison result, the signal analyzer is configured to further compare the first location characteristic of the first sensor to second location characteristic of the second sensor to detect a level of movement of an object relative to the first sensor and the second sensor; and
detect (i) that the characteristic of the signal indicates placement of an explosive device within the geographic area when the comparison result has a first value and (ii) that the characteristic of the signal does not indicate placement of an explosive device within the geographic area when the comparison result has a second value comprises detecting, by the base station, (i) that the level of movement of the object relative to the first sensor and the second sensor indicates placement of an explosive device within the geographic area when the level of movement indicates movement in proximity to one of the first sensor and the second sensor and (ii) that the level of movement of the object relative to the first sensor and the second sensor does not indicate placement of an explosive device within the geographic area when the level of movement indicates movement in proximity to both of the first sensor and the second sensor.

14. The base station of claim 13, wherein the base station is configured to generate a reporting output in response to detecting that the characteristic of the signal indicates placement of the explosive device within the geographic area.

15. The base station of claim 14, wherein, when generating the reporting output, the base station is configured to generate a graphical output showing a representation of the geographic area and a location of the at least one sensor generating the reporting signal.

16. The base station of claim 13, wherein:
when receiving, the base station is configured to (i) receive a first signal from a first sensor in the communications network, the first signal including a first timestamp characteristic that represents a time of the detected activity by the first sensor and (ii) receive a second signal from a second sensor in the communications network, the second signal including a second timestamp characteristic that represents a time of the detected activity by the second sensor; and
when comparing, the base station is configured to further compare the first timestamp characteristic of the first signal to second timestamp characteristic of the second signal to form the comparison result.

17. The base station of claim 13, wherein
when receiving, the base station is configured to (i) receive a first signal from a first sensor in the communications network, the first signal including a first timestamp characteristic that represents a time of the detected activity by the first sensor and a first location characteristic that represents a geographic location of the first sensor in the communications network and (ii) receive a second signal from a second sensor in the communications network, the second signal including a second timestamp characteristic that represents a time of the detected activity by the second sensor and the second signal including a second location characteristic that represents a geographic location of the second sensor in the communications network; and
when comparing, the base station is configured to correlate the first timestamp characteristic, the first location characteristic, the second timestamp characteristic, and the second location characteristic to form the comparison result.

18. The base station of claim 13, wherein the characteristic of the signal is selected from a group consisting of: a peak amplitude of a sensor input vibration, an average amplitude of a sensor input vibration, a signal to noise ratio of a sensor input vibration, a duration of a sensor input vibration, Kurtosis of a sensor input vibration, a spectral ratio of a sensor input vibration, tonality of a sensor input vibration, and a time of day at which the sensor generated the signal.

19. The base station of claim 18, wherein, when comparing, the base station is configured to correlate at least two selected characteristics of the signal to form the comparison result.

20. The base station of claim 13, wherein when comparing, the base station is configured to:
retrieve the baseline characteristic, corresponding to a selected characteristic of the signal, from a database of baseline characteristics; and
compare the selected characteristic of the signal to the baseline characteristic for the selected characteristic to form the comparison result.

21. The base station of claim 20, wherein the base station is configured to store the selected characteristic as the corresponding baseline characteristic in the database based upon the comparison result.

22. The base station of claim 13, wherein the base station is configured to adjust a detection threshold associated with the at least one sensor of the communication network to adjust a detection sensitivity of the at least one sensor.

23. In a base station of a communications network, a method for detecting placement of an explosive device within a geographic area, comprising:
receiving, by the base station, a first signal from a first sensor in the communications network, the first signal including a first location characteristic that represents a geographic location of the first sensor in the communications network;
receiving, by the base station, a second signal from a second sensor in the communications network, the second signal including a second location characteristic that represents a geographic location of the second sensor in the communications network;
comparing, by the base station, a first location characteristic of the first sensor to a second location characteristic of the second sensor to detect a level of movement of an object relative to the first sensor and the second sensor; and
detecting, by the base station, (i) that the level of movement of the object relative to the first sensor and the second sensor indicates placement of an explosive device within the geographic area when the level of movement indicates movement in proximity to one of the first sensor and the second sensor and (ii) that the level of movement of the object relative to the first sensor and the second sensor does not indicate placement of an explosive device within the geographic area when the level of movement indicates movement in proximity to both of the first sensor and the second sensor.

24. In a base station of a communications network, a method for detecting placement of an explosive device within a geographic area, comprising:
receiving, by the base station, a first signal from a first sensor in the communications network, the first signal including a first timestamp characteristic that represents a time of the detected activity by the first sensor and a first location characteristic that represents a geographic location of the first sensor in the communications network;
receiving a second signal from a second sensor in the communications network, the second signal including a second timestamp characteristic that represents a time of the detected activity by the second sensor and the second signal including a second location characteristic that represents a geographic location of the second sensor in the communications network;
correlating, by the base station, the first timestamp characteristic, the first location characteristic, the second timestamp characteristic, and the second location characteristic to detect a velocity of an object within the communications network; and
detecting, by the base station, (i) that the velocity of the object within the communications network indicates placement of an explosive device within the geographic area when the velocity has a first value and (ii) that the velocity of the object within the communications network does not indicate placement of an explosive device within the geographic area when the velocity has a second value.

* * * * *